April 7, 1931.                J. KENNEDY                1,799,170
                                BRAKE
                        Filed July 31, 1929    2 Sheets-Sheet 1

INVENTOR
Julian Kennedy
by
Byrnes, Stebbins, Parmelee &
Blenko
his attorneys

April 7, 1931.  J. KENNEDY  1,799,170
BRAKE
Filed July 31, 1929   2 Sheets-Sheet 2

INVENTOR
Julian Kennedy
by Byrnes, Stebbins, Parmelee & Blenko
his attorneys

Patented Apr. 7, 1931

1,799,170

UNITED STATES PATENT OFFICE

JULIAN KENNEDY, OF PITTSBURGH, PENNSYLVANIA

BRAKE

Application filed July 31, 1929. Serial No. 382,351.

This invention relates to brakes and is particularly valuable in so-called "Servo" or self-energizing brakes as for use in automobiles.

Automobile brake operating mechanisms must be contained within a small compass and are required to operate under adverse conditions, such as the presence of mud, water, and the like. The self-energizing brakes now employed are open to a number of defects. They employ small parts, such as cams or toggles, which require accurate manufacture, which, because of small size, lack ruggedness and which, because of the high unit pressures necessarily employed on the cam faces, followers or toggle pins, are subject to rapid wear.

In addition to the mechanical defects of present constructions, such constructions are also open to the objection that the brake pressure does not build up uniformly as the brake pedal is depressed, but usually builds up with extreme rapidity so that there can be no nicety of braking effort applied to the car. In the ideal brake, the amount of braking effort applied would be a straight line function of the depression of the brake pedal.

I provide a brake of the self-energizing type which substantially answers this ideal requirement and, in addition, is characterized by simplicity of construction, ease of manufacture and assembly, ruggedness, and long life. The construction is such that relatively large parts with ample linkage pins may be employed. I utilize an internal expanding brake having bell cranks operatively connected to the end portions of the brake-band with means for actuating the bell cranks. Preferably a common actuating means is employed, this means being connected to the bell cranks through an equalizer and a pair of substantially parallel links.

The parts are preferably symmetrically arranged so that the entire brake-band with its connected bell cranks may be turned over bodily and re-inserted in the brake drum after the brake has been in service for some time. In a self-energizing brake of this type the lining tends to wear progressively thinner around the brake-band and by providing this reversible construction, the life of the brake lining may be substantially doubled.

In the accompanying drawings, which illustrate the present preferred embodiment of the invention and certain modifications thereof, Figure 1 is a vertical section of an automobile brake embodying the invention, the face of the brake drum and the wheel being removed for clearness of illustration;

Figure 1:
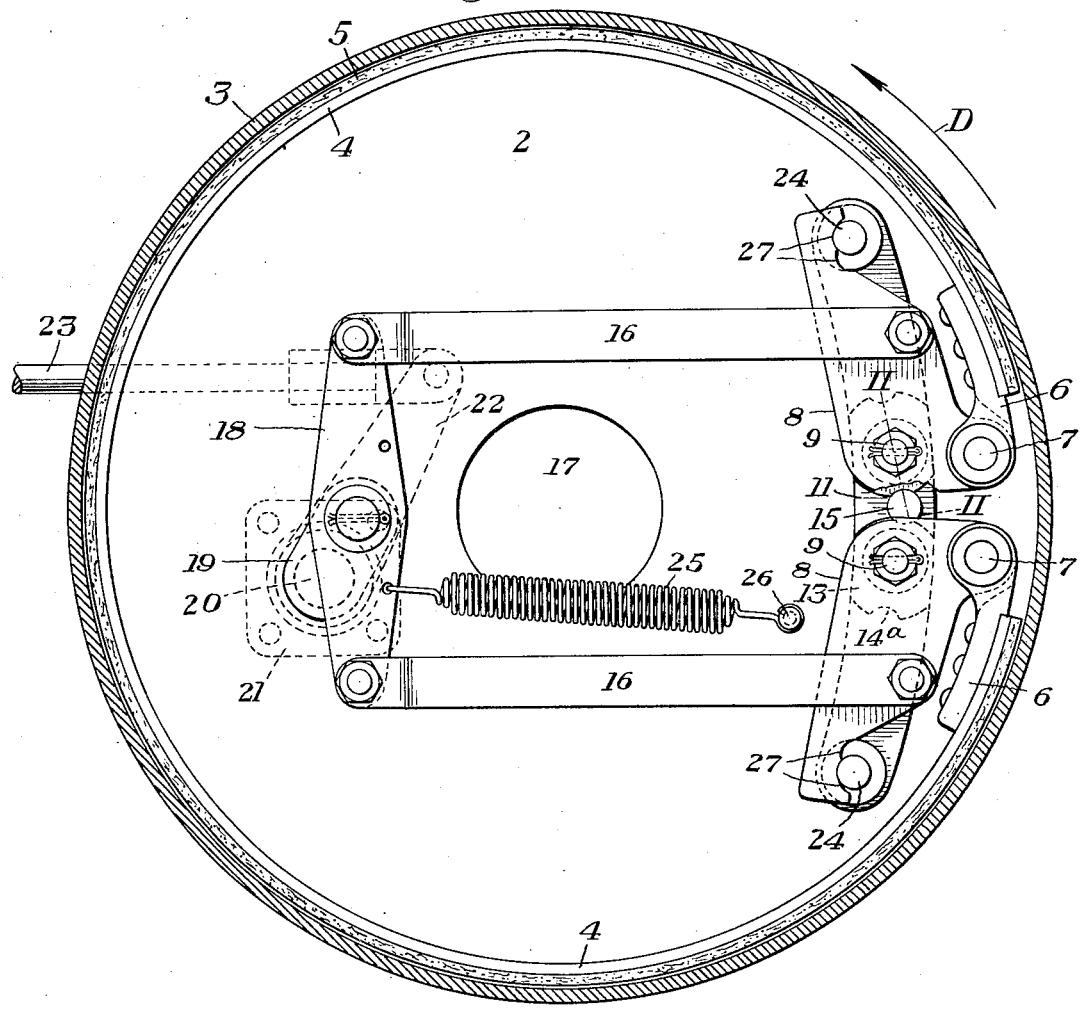
Figure 3:
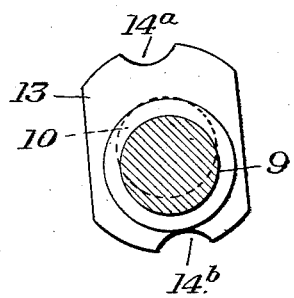
Figure 3 is a section through the stud taken on the line III—III of Figure 2.
Figure 2:
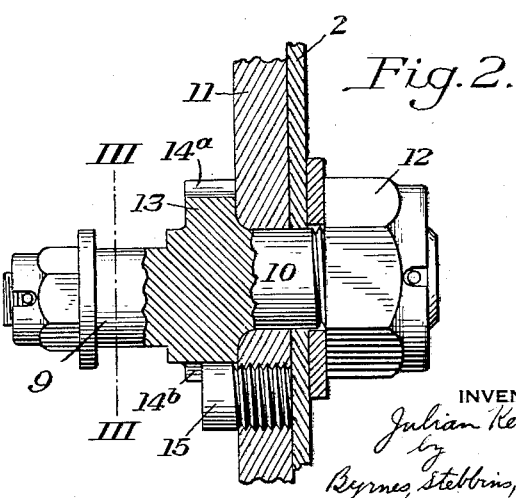
Figure 2 is a sectional view to enlarged scale taken on the line II—II of Figure 1 and showing the stud on which the bell cranks are mounted.

The brake shown in Figures 1 to 3 inclusive comprises a fixed disc-like housing portion 2, adapted to be connected to the end of the rear axle housing or to the front wheel pintle in accordance with standard construction, a brake drum 3 and an internal expanding brake-band 4 having a lining 5. In Figure 1 the drum 3 is shown in section but it will be understood that as is usual in brake constructions the drum 3 is upstanding from a disc connected to the wheel, the disc serving with the fixed housing 2 to enclose the brake operating mechanism.

At each end of the brake-band 4 there is riveted a connecting yoke 6 carrying a pivot pin 7 engaging one arm of a bell crank 8. Each bell crank is pivoted on a stud 9. The studs 9 are formed eccentrically on posts 10 extending through the housing member 2 and a re-inforcing strip 11, the posts being held in place by nuts 12. Each post 10 is provided with a flange 13 having notches 14a and 14b formed thereon. Either of these notches is adapted to engage a pin 15 in the reinforcing strip 11 and thus hold the stud 9 in either of two desired adjusted positions.

Each bell crank 8 is pivotally connected to a link 16. The links 16 extend in substantial parallelism past the central opening 17 in the housing through which the wheel axle extends and are connected at the ends remote from the bell cranks by an equalizer link 18. This equalizer link is pivotally mounted at its center on an operating lever 19 formed on a rock shaft 20 which extends through the housing 2 and a bearing block 21 thereon. Outside the brake mechanism the rock shaft 20 carries an arm 22 to which is connected the brake rod 23, which may be in turn connected to the brake pedal or hand brake lever, as desired.

When the parts are in the position of Figure 1, the brake band 4 is contracted to its innermost position, the contraction of the band being limited by stop pins 24 carried on the reinforcing strip 11. When the brake rod 23 is pulled the equalizer 18 is forced to the left, as viewed in the drawings, thus rocking the bell crank levers and expanding the brake band 4. The direction of normal rotation of the wheel is shown by the arrow D in Figure 1. When the brake band has been expanded in an amount sufficient to engage the drum 3 friction between the brake drum and the lining tends to rotate the band 4 with the drum. This results in the brake band exerting pressure on the lower bell crank lever 8, causing it to remain in engagement with the pin 24, all of the expansion movement of the band 4 being thereafter effected by the rotation of the upper bell crank 8. The equalizer 18 permits this.

The frictional engagement of the brake lining 5 on the drum causes the building up of successively higher unit pressures around the drum, the brake being self-energizing. When the brake rod 23 is released, the parts return to their normal position and the braking pressure is released. The return to normal position may be effected by the spring-like action of the band, but there will usually be provided a spring (not shown) connected to the brake rod 23.

If the car is moving backward at the time the braking pressure is applied, the upper bell crank will stay against its stop pin and the braking effort will be applied by rocking the lower bell crank about its pivot. Because of clearance between the brake lining and the drum, it will be seen that normally the mechanism thus far described would tend to operate in such manner that both bell cranks would move away from their stop pins until the brake lining came into engagement with the drum 3 and the brake band would thereafter be rotated a slight amount sufficiently to bring one or the other of the bell cranks against its stop, depending on which way the car is moving.

In order to eliminate the slight clicking which might result from such operation, I provide a spring 25 extending from a pin 26 on the housingway to the equalizer link 18. The spring 25 is so connected as to normally urge the lower bell crank 8 against its stop pin 24. Since the usual application of the brake is when the car is moving forwardly, there will in such operation be no clicking of the mechanism as the lower bell crank 8 will remain against its stop pin when the brake rod is actuated. If the car is moving backwardly when the brake is applied, the force of the spring 25 will be overcome and the lower bell crank 8 will be rocked away from its stop.

By reason of the arrangement of the bell cranks, links and equalizers, and by reason of the relatively large size of these parts, the effective moment arms in the various parts of the mechanism remain substantially constant, thus giving the desired straight line action of the brake.

As the lining wears, the amount of lost motion before the brake is applied will increase and it is desirable to reduce such lost motion. The flanged posts 10 provide an adjusting means. After the lining has worn to some extent, the nuts 12 are loosened and the posts 10 are slipped outwardly in an amount sufficient to clear the pin 15 and permit rotation of the posts until the recesses 14a rather than the recesses 14b are in position to engage the pin 15. By reason of the fact that the studs 9 are eccentrically mounted on the posts 10, this is effective for separating the pivot points of the bell cranks, thus reducing the clearance and taking up a large amount of the lost motion.

The bell cranks 8 are provided at their outer ends with pairs of notches 27 which engage the stop pins 24 regardless of the adjusted position of the post 10.

By reason of the fact that the unit pressure around the brake-band progressively increases the lining will tend to wear thinnest at the end adjacent the lower bell crank 8, and if the worn lining were straightened out it would be substantially wedge shaped, being of practically its orginal thickness adjacent one end and thinnest at the other end. The brake-band, connecting yokes 6 and bell cranks 8 form a symmetrical assembly which, by removal of the nuts on the posts 10 may be lifted upwardly, turned over and put back in place, thus pivoting the bell crank, shown in the lower position on the drawings, at the upper post 9 and vice versa. This brings the thinnest portion of the lining at the place where it is subjected to least wear and thus practically doubles the life of the lining.

Figure 4:
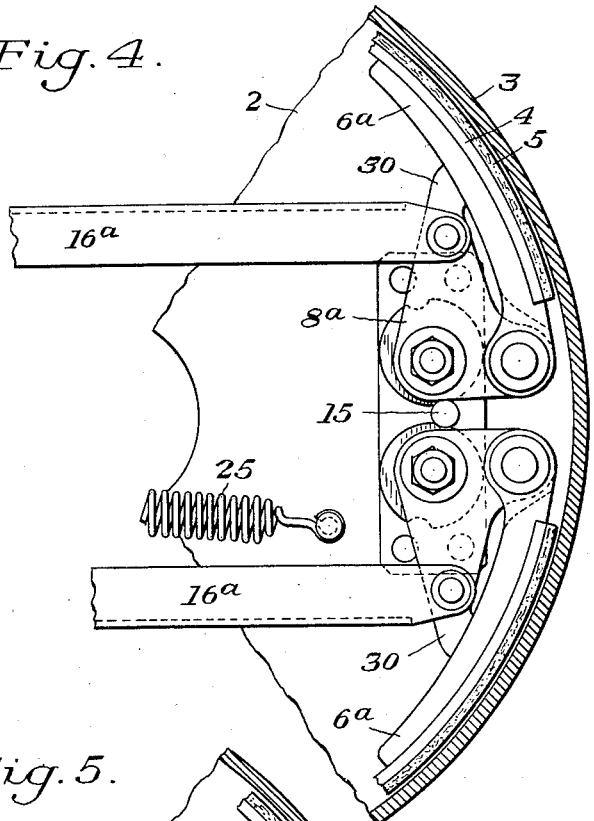
Figures 4 and 5 are views corresponding to Figure 1 but partly broken away and showing modifications.

Figure 4 shows a mechanism similar to that of Figure 1 except that the bell crank levers 8a are provided with extensions 30 which engage the yokes 6a and form the stops for the bell cranks. This mechanism, while it may tend to a slight localization of pressure on the brake drum, has the advantage of simplicity of construction and elimination of the stop pins 24. The links 16a are formed to general U-shape in cross section from sheet metal and have end portions which embrace the bell cranks 8 and the equalizer. With this construction there is no necessity for disconnecting the links from the bell cranks when the mechanism is to be reversed.

Figure 5:
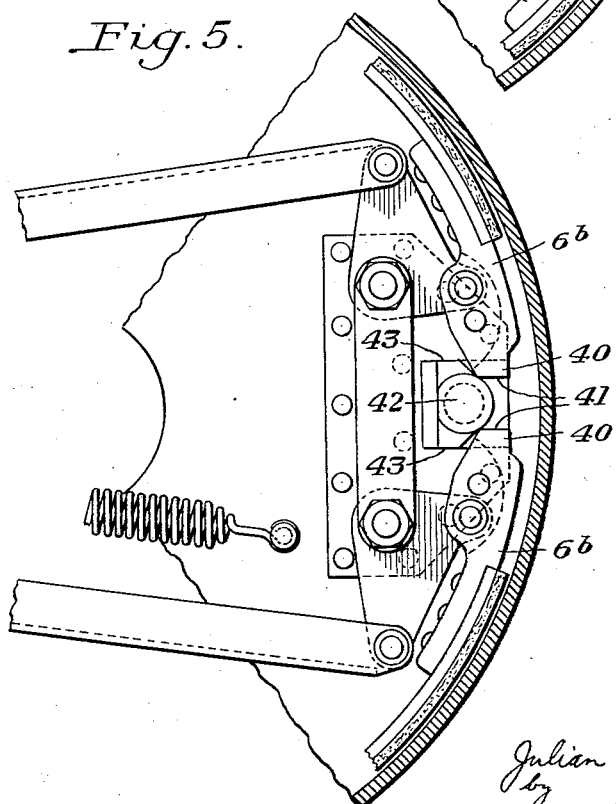

Figure 5 shows a further modification wherein the yokes 6b are provided with extensions 40 engaging opposed faces 41 of a head on a pin 42. The pin 42 may be rotated through 180° so as to bring head faces 43 into position to be engaged by the extensions 40, thus taking up for wear. Obviously any practical number of pairs of faces differently spaced may be provided on the head of the bolt 42 so as to give different adjustments.

In all the forms of the invention the parts are relatively large as compared with actuating parts in present brake mechanisms and may be manufactured at relatively low expense. By reason of the fact that the links extend past the axis of the brake, the bell cranks and the equalizer lying on opposite sides thereof, relatively long links may be employed, thus maintaining the moment arms substantially constant at all times. The invention lends itself readily to inexpensive manufacture and to unit assembly. It is readily adjusted, is positive in use and is self-energizing in either direction.

I have illustrated and described a present preferred embodiment of the invention and certain modifications thereof. It will be understood, however, that it is not limited to the forms shown but may be otherwise embodied or practiced within the scope of the following claims.

I claim:

1. A brake comprising a drum, an internal cooperating expanding band, bell cranks operatively connected to the end portions of the band, a link for operating each bell crank, an equalizer connecting the links, means for moving the equalizer, and means for biasing the equalizer.

2. A brake comprising a drum, an internal cooperating expanding band, bell cranks operatively connected to the end portions of the band, means for actuating the bell cranks, and means for shifting the pivot point of a bell crank.

3. A brake comprising a drum, an internal cooperating expanding band, bell cranks operatively connected to the end portions of the band, means for actuating the bell cranks, and studs about which the bell cranks are workable, the studs being eccentrically mounted on posts rotatable to different positions.

4. A brake comprising a drum, an internal cooperating expanding band, bell cranks operatively connected to the end portions of the band, and links engaging the bell cranks for actuating the same, the links for the two bell cranks extending in general parallelism and at substantially right angles to the effective arms of the bell cranks to which said links are connected.

5. A brake comprising a drum, an internal cooperating expanding band, bell cranks operatively connected to the end portions of the band, and links for actuating the bell cranks, the bell cranks having their pivot points adjacent one another and having their arms connecting with the ends of the band extending in general parallelism, the effective arms to which the links are connected extending at substantially right angles to the arms to which the band ends are connected, the links extending at substantially right angles to the arms to which they are connected.

6. A brake comprising a drum, an internal cooperating expanding band, bell cranks operatively connected to the end portions of the band, and links for actuating the bell cranks, the bell cranks having their pivot points adjacent one another, the arms to which the actuating means are connected extending in opposite directions from the pivot points.

7. A brake comprising a drum, an internal cooperating expanding band, bell cranks operatively connected to the end portions of the band, and links connected to the bell cranks for actuating the same, the bell cranks being pivoted at points adjacent one another and having arms extending away from one another, the links being relatively widely spaced apart and pivoted on said arms.

8. A brake comprising a drum, an internal cooperating expanding band, bell cranks operatively connected to the end portions of the bank, and links connected to the bell cranks for actuating the same, the bell cranks being pivoted at points adjacent one another and having arms extending away from one another, the links being relatively widely spaced apart and pivoted on said arms, the links extending past the axis of the brake and being connected by an equalizer.

In testimony whereof I have hereunto set my hand.

JULIAN KENNEDY.